(No Model.) 2 Sheets—Sheet 1.

F. PICHLER & K. SEDLACEK.
APPARATUS FOR PURIFYING AND SOFTENING WATER.

No. 278,178. Patented May 22, 1883.

WITNESSES:
William Miller
Otto Hufeland

INVENTOR
Franz Pichler
Karl Sedlacek
BY VanSantvoord & Hauff
their ATTORNEYS (No Model.) 2 Sheets—Sheet 2.
F. PICHLER & K. SEDLACEK.
APPARATUS FOR PURIFYING AND SOFTENING WATER.
No. 278,178. Patented May 22, 1883.
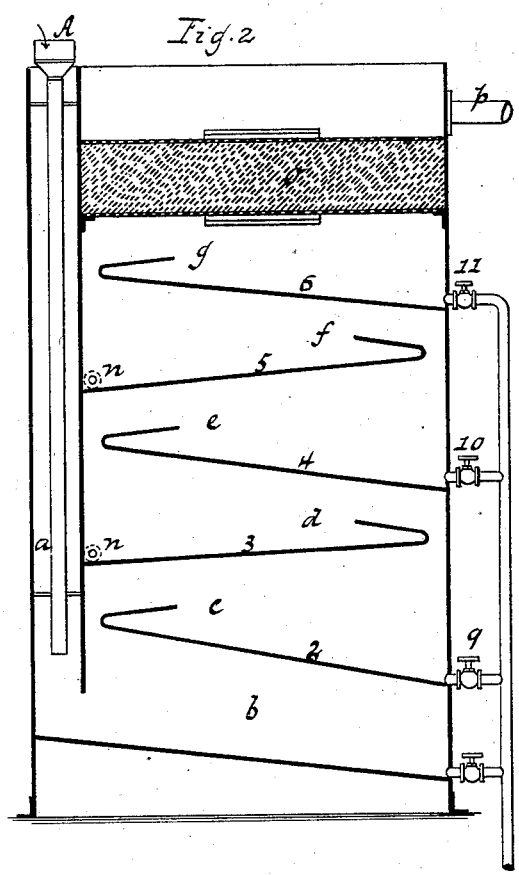
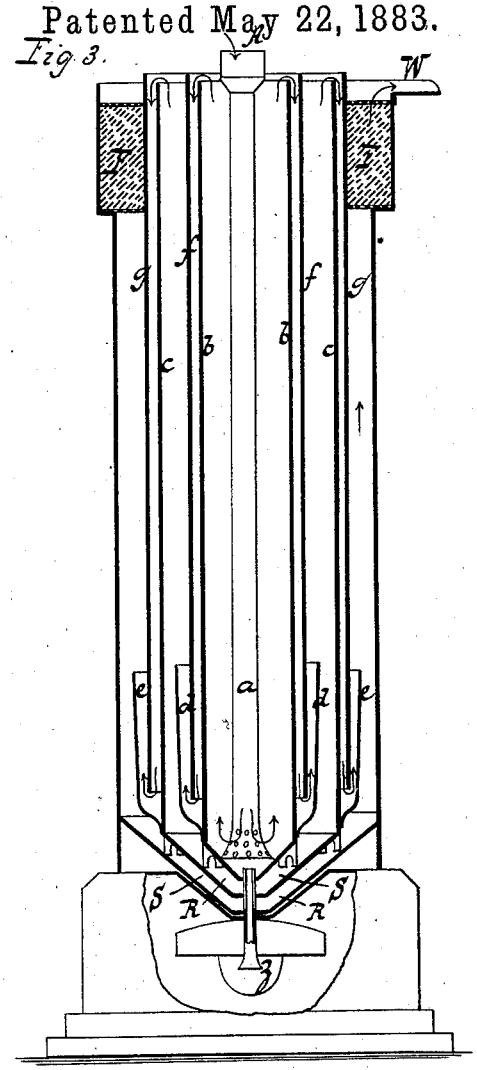
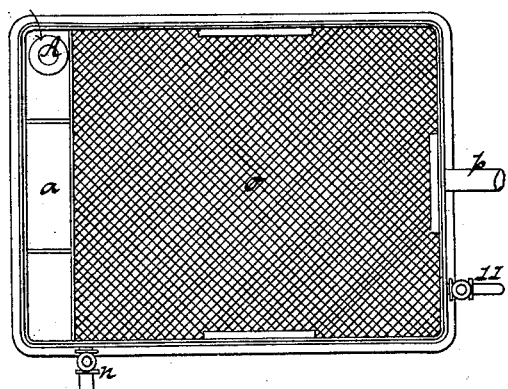
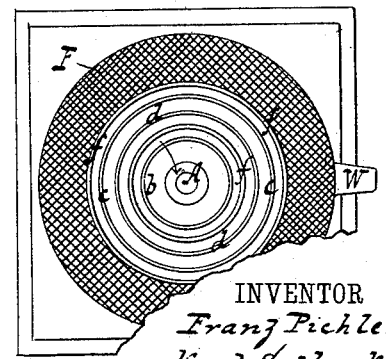
WITNESSES:
William Miller
Otto Hufeland
INVENTOR
Franz Pichler
Karl Sedlacek
BY VanSantvoord & Hauff
their ATTORNEYS
N. PETERS, Photo-Lithographer, Washington, D. C.

UNITED STATES PATENT OFFICE.

FRANZ PICHLER AND KARL SEDLACEK, OF VIENNA, AUSTRIA-HUNGARY.

APPARATUS FOR PURIFYING AND SOFTENING WATER.

SPECIFICATION forming part of Letters Patent No. 278,178, dated May 22, 1883.

Application filed August 24, 1882. (No model.)

*To all whom it may concern:*

Be it known that we, FRANZ PICHLER and KARL SEDLACEK, both citizens of Austria, residing at Vienna, in the Empire of Austria, have invented new and useful Improvements in Apparatus for Purifying and Softening Water, of which the following is a specification.

This invention relates to an improved apparatus for purifying and softening water, consisting of a case or receptacle provided with purifying-chambers, sediment-chambers, partitions separating the various chambers, and a filter, substantially as hereinafter more fully set forth. Valves for emptying the sediment-chambers may be provided.

Figure 1:
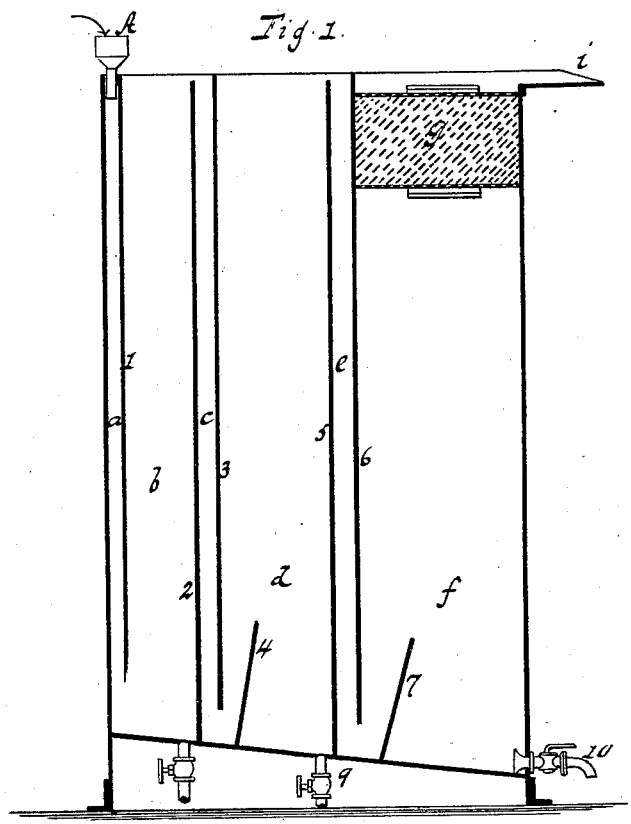
Figure 4:
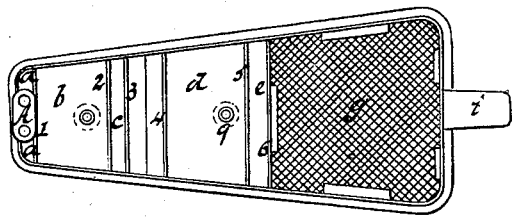

In the drawings, Figures 1 and 4 illustrate, respectively, a vertical cross-section and a plan view of the apparatus. The remaining figures show modifications, which will be more fully described hereinafter.

The principal object of our invention is to obtain an apparatus which is simpler, cheaper, more useful, and less cumbersome than the apparatuses heretofore in use for this purpose.

As regards the chemical process, as also the choice of reagents for the preparation of the water and the arrangement of the vessels containing the reagents, the same are already known, and depend in part upon the character of the water, and partly upon local causes, and this invention does not relate to the same, but solely to the construction of the apparatus.

The chief feature of our invention consists in obtaining an apparatus of any desired form, which is provided, by means of partitions or of concentric cylinders, with several chambers of increasing cross-sections, so that the onward movement of the water is thereby retarded and the deposit of sediment is secured.

In the drawings, Figs. 1 and 4 show a case or receptacle, into which leads an inlet-pipe, A. We prefer to have the inlet-pipes consist of two branches, as seen in Fig. 4—one for the influx of water, the other for the reagent. From the inlet-pipe A the fluids pass into the chamber $a$, formed by the partition 1, in which chamber $a$, by the mixing of the water and the reagent, the reaction and purification of the former begins. The fluid passes through underneath partition 1 into the purifying-chamber $b$, the partition 2 of which allows the liquid to flow over into the purifying-chamber $c$, from whence it passes through under partition 3 into the sediment-chamber $d$. In this chamber $d$, because of its increased cross-section, Fig. 4, the movement of the liquid is considerably slower, wherefore the specifically heavier chemical combinations are here deposited in the form of flocks. The slowly-rising liquid flows over the top of partition 5 into the purifying-chamber $e$, from whence it passes under the partition 6 into the sediment-chamber $f$. The sediment-chambers $d$ and $f$ are provided with small partitions 4 and 7, which cause the liquid resting beneath them to remain free from agitation, and thus secure the deposit of the impurities. Faucets 9 and 10, at the lower part of the sediment-chambers, allow of the withdrawal of the deposits. The liquid passes up in the chamber $f$ and through the filter-space $g$, which is filled with coke, charcoal, felt, wood fiber, paper-pulp, or like filtering materials. After passing through the filter the reaction is fully completed, and the purified and soft water passes into a spout, $i$, from whence it is led off for use.

The apparatus shown in Fig. 2 in vertical cross-section and in Fig. 5 in plan view has the partitions attached in an inclined position to the side walls of the rectangular case, so that the liquid entering by the inlet-pipe A passes from the chamber $a$ into chamber $b$, and thence back and forth through the openings in the partitions 2 3 4 5 6. The return-bends of these partitions 2 3 4 5 6 cause the sediment of the liquid to deposit in the sediment-chambers $c\ d\ e\ f\ g$, from whence it can be drawn off through the faucets 9 10 11 and $n$. After passing up through the filter $o$ the purified and soft water arrives at the spout $p$, from whence it can be drawn off. It will be noticed that in this apparatus the inlet-pipe A, instead of being made of two branches, one alongside the other, as in the first instance, is made of two concentric pipes, one inside the other.

The apparatus, of which a central cross-section is shown in Fig. 3 and a plan in Fig. 6, consists of cylinders with conical bottoms, and placed one within the other, the inner ones resting on their conical bottoms, the outer one being placed on a stand. The inner cylinders, $b\ c$, are surrounded at their lower ends with deflecting-partitions $d\,e$, and the said cylinders are also surrounded with cylinders $f\,g$, open at the bottom, and whose upper rims are on a somewhat higher level than the upper rims of the cylinders $b\,c$. By this arrangement the liquid is caused to flow alternately up and down, and the deflecting-partitions $d\,e$ allow the sediment to deposit in the sediment-chambers R S. The inlet-pipe A is in this case also made of concentric tubes, one within the other, and leads into a cylindrical chamber, $a$, perforated at the lower end and resting on the conical bottom of the cylinder $b$. The arrows show the directions of movement of the liquid. By reason of the gradually-increasing cross-section of the cylinders or cylindrical chambers the movement of the water gradually becomes slower, and thus allows of a ready deposit of the impurities in the sediment-chambers R S. These sediment-chambers are in communication with a tube, $z$, which may be closed by a screw-cap, or other suitable means, and through which the sediment may be drawn off. This tube $z$ is also in communication with the first cylinder, $b$, and serves to empty the same. The liquid, in rising up in the outer cylinder, passes through the filter F, and thence to the spout W, whence it is led off.

The water thus treated may be employed for various industrial purposes—such as feeding boilers, wool-washing, in paper-factories, sugar-refineries, and other uses.

What we claim as new, and desire to secure by Letters Patent, is—

1. An apparatus for purifying and softening water, combining in its structure a case or receptacle, two independent inlets located at the top portion of the said case or receptacle—one for introducing the water and the other the reagent for purifying the water—a series of partitions dividing the case or receptacle into a chamber wherein the reagent and water are received and the reaction and purification begin, a purifying-chamber and a series of sediment-collecting chambers, and a filter arranged at the top portion of the case or receptacle, said members being arranged in the described relation, substantially as described.

2. An apparatus for purifying and softening water, consisting of a case or receptacle provided with a series of purifying-chambers and sediment-chambers of gradually-increasing capacity, and a filter, substantially as and for the purpose set forth.

In testimony whereof we have hereunto set our hands in the presence of two subscribing witnesses.

FZ. PICHLER.
KARL SEDLACEK.

Witnesses:
EDUARD WINKELMANN,
WILLIAM HUNING.